United States Patent
Zhou et al.

(10) Patent No.: US 12,545,146 B2
(45) Date of Patent: *Feb. 10, 2026

(54) METHOD AND SYSTEM FOR HEAT PRESERVATION OF BATTERY OF VEHICLE, STORAGE MEDIUM AND PROCESSOR

(71) Applicant: GREAT WALL MOTOR COMPANY LIMITED, Hebei (CN)

(72) Inventors: Mingwang Zhou, Hebei (CN); Maiqing Wu, Hebei (CN); Song Han, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 628 days.

This patent is subject to a terminal disclaimer.

(21) Appl. No.: 17/918,169

(22) PCT Filed: May 6, 2021

(86) PCT No.: PCT/CN2021/091950
§ 371 (c)(1),
(2) Date: Oct. 11, 2022

(87) PCT Pub. No.: WO2021/223717
PCT Pub. Date: Nov. 11, 2021

(65) Prior Publication Data
US 2023/0127667 A1    Apr. 27, 2023

(30) Foreign Application Priority Data

May 7, 2020 (CN) .......................... 202010378179.X

(51) Int. Cl.
*H02J 7/00* (2006.01)
*B60L 58/27* (2019.01)
(Continued)

(52) U.S. Cl.
CPC ............... *B60L 58/27* (2019.02); *B60L 58/34* (2019.02)

(58) Field of Classification Search
CPC ................................. B60L 58/27; B60L 58/34
(Continued)

(56) References Cited

U.S. PATENT DOCUMENTS 10,392,018 B1 * 8/2019 Rhodes .................... B60L 58/25
12,187,137 B2 * 1/2025 Zhao ........................ B60L 58/27
(Continued)

FOREIGN PATENT DOCUMENTS

CN          104890524 A       6/2005
CN          103612570 A       3/2014
(Continued)

OTHER PUBLICATIONS

International Search Report for PCT/CN2021/091950 issued Jul. 29, 2021.

*Primary Examiner* — Alexis B Pacheco
(74) *Attorney, Agent, or Firm* — Schmeiser, Olsen & Watts LLP

(57) ABSTRACT

A method and a system for heat preservation of a battery of a vehicle, and a storage medium is provided. The method includes: detecting, in response to completing the charging of the vehicle, whether a current temperature of the battery of the vehicle is lower than a preset temperature threshold value of the battery, and the temperature threshold value is configured as a lowest temperature value at which the battery is able to maintain normal performance; and controlling, when a detection result is yes, the vehicle to obtain an electrical energy from an external charging device to heat the battery, such that the battery is heated above the temperature threshold value to complete heat preservation of the battery. The method provided by the present application can
(Continued)

heat the battery without consuming the power of the battery used for endurance mileage of the vehicle when the battery is charged.

9 Claims, 3 Drawing Sheets

(51) Int. Cl.
*B60L 58/34* (2019.01)
*H02J 7/14* (2006.01)

(58) Field of Classification Search
USPC .................................................. 320/109, 134
See application file for complete search history.

(56) References Cited

U.S. PATENT DOCUMENTS

| | | | | |
|---|---|---|---|---|
| 2013/0162027 | A1* | 6/2013 | Yamamoto | B60L 1/02 307/9.1 |
| 2014/0012447 | A1* | 1/2014 | Gao | B60L 58/13 701/22 |
| 2014/0379209 | A1* | 12/2014 | Matsuda | B60L 58/16 701/34.2 |
| 2015/0236525 | A1* | 8/2015 | Aridome | H02J 7/005 320/107 |
| 2015/0306974 | A1* | 10/2015 | Mardall | H01M 10/625 429/120 |
| 2017/0217328 | A1 | 8/2017 | Patel | |
| 2017/0305294 | A1* | 10/2017 | Hettrich | B60L 58/27 |
| 2018/0339601 | A1* | 11/2018 | Kruszelnicki | B60L 53/16 |
| 2019/0157882 | A1* | 5/2019 | Sherback | H02J 7/0013 |
| 2019/0299790 | A1* | 10/2019 | Smith | H01M 10/65 |
| 2020/0231060 | A1* | 7/2020 | Matsuyama | B60L 53/62 |
| 2020/0238850 | A1* | 7/2020 | Kusada | B60L 58/27 |
| 2021/0218073 | A1* | 7/2021 | Duan | B60L 53/66 |
| 2021/0247450 | A1* | 8/2021 | Ito | H01M 10/44 |
| 2022/0185135 | A1* | 6/2022 | Langton | B60L 58/12 |
| 2022/0250506 | A1* | 8/2022 | Goldman-Shenhar | G01C 21/3469 |

FOREIGN PATENT DOCUMENTS

| | | | | |
|---|---|---|---|---|
| CN | 108146269 A | | 6/2018 | |
| CN | 108258273 A | | 7/2018 | |
| CN | 108493517 A | | 9/2018 | |
| CN | 109244568 A | | 1/2019 | |
| CN | 109449542 A | | 3/2019 | |
| CN | 110015201 A | * | 7/2019 | .......... H01M 10/633 |
| CN | 112319313 A | | 2/2021 | |
| JP | 2017224578 A | | 12/2017 | |

* cited by examiner

METHOD AND SYSTEM FOR HEAT
PRESERVATION OF BATTERY OF VEHICLE,
STORAGE MEDIUM AND PROCESSOR

CROSS-REFERENCE TO RELATED APPLICATIONS

This application claims priority to PCT/CN2021/091950, having a filing date of May 6, 2021, which is based on Chinese Patent Application No. 202010378179.X, having a filing date of May 7, 2020, the entire contents both of which are hereby incorporated by reference.

FIELD OF TECHNOLOGY

The following relates to the technical field of a battery of a vehicle, and more particularly to a method and a system for heat preservation of a battery of a vehicle, a storage medium, and a processor.

BACKGROUND

Fuel cell vehicles generally provide driving energy through fuel cells and power batteries. Whether the fuel cell or the power battery, the working performance of which is related to the temperature itself, and when the temperature is lower, the working performance will deteriorate.

At present, after the power battery of the vehicle is charged, the vehicle is then automatically in a power-off hibernation state. If the fuel cell or power battery continues to be in a low temperature environment after the vehicle has been in the power-off hibernation state, the fuel cell or power battery can also be affected by the low temperature environment and cause temperature of the fuel cell or power battery to be too low: if the vehicle is started at this time, in order to ensure that the fuel cell or power battery has better performance, the vehicle controller uses the stored power of the power battery to heat the low-temperature fuel cell or power battery. This method of heating the fuel cell or the power battery will consume the power of the power battery, thereby affecting the endurance mileage of the vehicle.

SUMMARY

An aspect relates to a method for heat preservation of a battery of a vehicle, so as to heat the battery without consuming the power of the battery used for endurance mileage of the vehicle when the battery is charged.

In order to achieve above aspect, the technical solution of the present application is realized by providing a method for heat preservation of a battery of a vehicle, and the method includes steps of: detecting, through a battery management system and/or a fuel cell unit, in response to completing the charging of the vehicle, whether a current temperature of the battery of the vehicle is lower than a preset temperature threshold value of the battery, and the temperature threshold value is configured as a lowest temperature value at which the battery is able to maintain normal performance; and controlling, through a vehicle controller, when a detection result is yes, the vehicle to obtain an electrical energy from an external charging device to heat the battery, such that the battery is heated above the temperature threshold value to complete heat preservation of the battery.

In an embodiment, the method further includes step of controlling, when the detection result is no or the battery has been heated above the temperature threshold value, the vehicle to enter a sleep mode, wherein the sleep mode is configured as that a powered device of the vehicle is in a power-off hibernation state.

In an embodiment, the after controlling the vehicle to enter the sleep mode, the method further includes steps of: repeating following steps until the vehicle is started: controlling the vehicle to be awakened from the sleep mode after the vehicle has entered the sleep mode for a preset time: continuing to detect whether the current temperature of the battery of the vehicle is lower than the temperature threshold value: controlling, when a continued detection result is yes, the vehicle to obtain an energy from an external charging device to heat the battery, such that the battery is heated above the temperature threshold value; and controlling, when the continued detection result is no or the battery has been heated above the temperature threshold value, the vehicle to continue to enter the sleep mode.

In an embodiment, the battery includes a fuel cell and a power battery: the step of detecting whether the current temperature of the battery of the vehicle is lower than a preset temperature threshold value of the battery includes: detecting whether the current temperature of the fuel cell of the vehicle is lower than a preset temperature threshold value of the fuel cell, and detecting whether the current temperature of the power battery of the vehicle is lower than a preset temperature threshold value of the power battery: the step of controlling, when the detection result is yes, the vehicle to obtain the electrical energy from the external charging device to heat the battery, such that the battery is heated above the temperature threshold value includes: controlling, when a detection result for the fuel cell is yes, the vehicle to obtain the electrical energy from the external charging device to heat the fuel cell, such that the fuel cell is heated above the temperature threshold value; and controlling, when a detection result for the power battery is yes, the vehicle to obtain the electrical energy from the external charging device to heat the power battery, such that the power battery is heated above the temperature threshold value; and the step of controlling, when the detection result is no or the battery has been heated above the temperature threshold value, the vehicle to enter the sleep mode includes: controlling the vehicle to enter the sleep mode when following conditions are met: the detection result for the fuel cell is no or the fuel cell has been heated above the temperature threshold value; and the detection result for the power battery is no or the power battery has been heated above the temperature threshold value.

In an embodiment, the method further includes a step of: controlling, in response to press operation of a user on a button for activating a function of charging and heat preservation, the vehicle to activate the function of charging and heat preservation, to perform the step of detecting whether the current temperature of the battery of the vehicle is lower than the preset temperature threshold value of the battery.

Compared with the conventional art, the method of the present application has the following advantages:

By in response to completing of the charging of the vehicle, then state to detect whether the current temperature of the battery of the vehicle is lower than the preset temperature threshold value of the battery: the detection is mainly used to determine whether the temperature of the battery of the vehicle is too low and needs to be heated. By using the manner that the vehicle obtains an electrical energy from an external charging device to heat the battery, the power loss caused by heating the battery when the vehicle is started in the conventional art can be avoided, so that the vehicle can be maintained as fully charged as possible when starting after charging.

In addition, an embodiment of the present application further provides a system for heat preservation of a battery of a vehicle, and the system includes: a vehicle controller, configured for detecting, in response to completing the charging of the vehicle, whether a current temperature of the battery of the vehicle is lower than a preset temperature threshold value of the battery, and the temperature threshold value is configured as a lowest temperature value at which the battery is able to maintain normal performance; and an on-board charger, configured for controlling, when a detection result is yes, the vehicle to obtain an electrical energy from a power grid to heat the battery through a heater, such that the battery is heated above the temperature threshold value to complete heat preservation of the battery.

In an embodiment, the vehicle controller is further configured for controlling, when the detection result is no or the battery has been heated above the temperature threshold value, the vehicle to enter a sleep mode, wherein the sleep mode is configured as that a powered device of the vehicle is in a power-off hibernation state.

In an embodiment, the vehicle controller is further configured for repeating following steps until the vehicle is started after controlling the vehicle to enter the sleep mode: controlling the vehicle to be awakened from the sleep mode after the vehicle has entered the sleep mode for a preset time: continuing to detect whether the current temperature of the battery of the vehicle is lower than the temperature threshold value: controlling, when a continued detection result is yes, the vehicle to obtain an energy from an external charging device to heat the battery, such that the battery is heated above the temperature threshold value; and controlling, when the continued detection result is no or the battery has been heated above the temperature threshold value, the vehicle to continue to enter the sleep mode.

In an embodiment, the system further includes: an on-board host, configured for controlling, in response to press operation of a user on a button for activating a function of charging and heat preservation, the vehicle to activate the function of charging and heat preservation, to perform, through the vehicle controller, the step of detecting whether the current temperature of the battery of the vehicle is lower than the preset temperature threshold value of the battery.

In addition, an embodiment of the present application further provides a computer-readable storage medium on which computer program instructions are stored, and the instructions are configured for executing the method for heat preservation of a battery of a vehicle above-mentioned through a machine.

In addition, an embodiment of the present application further provides a processor, configured for running a program, and when the program is running, the method for heat preservation of a battery of a vehicle above-mentioned is executed.

The system for heat preservation of a battery of a vehicle, the computer-readable storage medium, and the processor have the same advantages as the above-mentioned method for heat preservation of a battery of a vehicle relative to the conventional art, which is not repeated here.

Other features and advantages of the present application are described in detail in the detailed description that follows.

BRIEF DESCRIPTION

Some of the embodiments will be described in detail, with references to the following Figures, wherein like designations denote like members, wherein.

The reference signs in the Drawings

400—system for heat preservation of a battery of a vehicle:
401—vehicle controller: 402—on-board charger:
403—heater: 404—on-board host.

DETAILED DESCRIPTION

It should be noted that the embodiments of the present application and the features of the embodiments may be combined with each other without conflict.

The present application is aimed at the heating and heat preservation of the battery of the fuel cell vehicle after the vehicle is charged. Although the conventional art discloses the heating and heat preservation of the battery, the conventional art does not perform the above operation after the vehicle is fully charged, and the conventional art utilizes the electric energy of the battery of the vehicle, which will shorten the endurance mileage of the vehicle. The technical solutions of the embodiments of the present application will be described in detail below with reference to the accompanying drawings.

Figure 1:
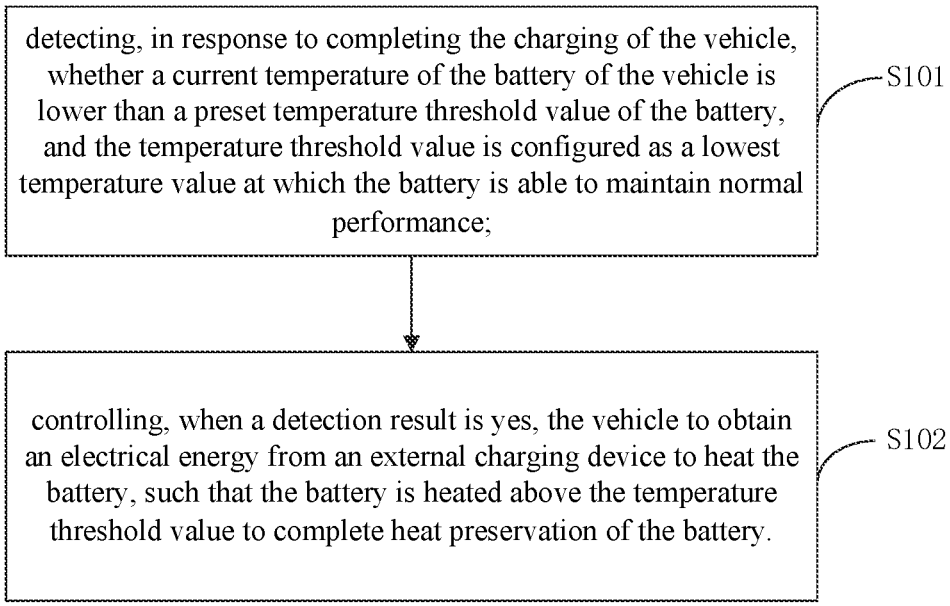
FIG. 1 is a flowchart of a method for heat preservation of a battery of a vehicle according to an embodiment of the present application.

FIG. 1 is a flowchart of a method for heat preservation of a battery of a vehicle according to an embodiment of the present application. As shown in FIG. 1, the method includes steps of:

S101: detecting, in response to completing the charging of the vehicle, whether a current temperature of the battery of the vehicle is lower than a preset temperature threshold value of the battery, and the temperature threshold value is configured as a lowest temperature value at which the battery is able to maintain normal performance; and S102: controlling, when a detection result is yes, the vehicle to obtain an electrical energy from an external charging device to heat the battery, such that the battery is heated above the temperature threshold value to complete heat preservation of the battery.

In the embodiment, the external charging device is an on-board charger, and the electric energy of the on-board charger comes from a power grid that charges the vehicle, and the component that heats the battery is a PTC heater, where the full name of PTC is Positive Temperature Coefficient, which generally refers to a semiconductor material or component with a large positive temperature coefficient, for example, the PTC is a PTC thermistor.

In the embodiment, when the driver performs external plug-in charging on the vehicle, the vehicle reminds the driver whether to perform the function for heat preservation of the battery: When the driver selects to execute the function, the current temperature of the battery is diagnosed after the vehicle is fully charged. The steps of diagnosing the current temperature of the battery will be described in detail below by taking power batteries and fuel cells as examples.

It should be noted that when refers to control the battery, the control of the power battery can generally refer to the control of the battery management system (BMS), and the control of the fuel cell can be expressed as a fuel cell unit (FCU). Therefore, in the embodiment of the present application, the power battery and the BMS can be equally understood, and the fuel cell and the FCU can also be equally understood.

It can be seen from the above description that the power battery and the fuel cell have different temperature threshold values due to different types. In the embodiment, the temperature threshold value of the power battery is 20° C., and the temperature threshold value of the fuel cell is 5° C. For the BMS, when the current temperature of the power battery is detected to be lower than 20° C., the vehicle controller will request the on-board charger to obtain electrical energy from the power grid to heat the BMS, and when the BMS is heated to a temperature greater than or equal to 20° C., the heating is stopped to complete the heat preservation of the BMS. For the FCU, when the current temperature of the FCU is detected to be lower than 5° C., the vehicle controller will request the on-board charger to obtain electrical energy from the power grid to heat the FCU, and when the FCU is heated to a temperature greater than or equal to 5° C., the heating is stopped to complete the heat preservation of the FCU.

Further, in an embodiment, controlling, when the detection result is no or the battery has been heated above the temperature threshold value, the vehicle to enter a sleep mode.

In the embodiment, the sleep mode is configured as that a powered device of the vehicle is in a power-off hibernation state. That is, the power consumption of the powered device of the vehicle is extremely low or no power consumption, which greatly reduces power consumption.

In the embodiment, when diagnosing a hybrid vehicle with BMS and FCU, both the following condition 1 and condition 2 are met to enter the sleep mode:

Condition 1: the current temperature of the BMS is detected to be greater than or equal to 20° C.: or the BMS is heated to a temperature greater than or equal to 20° C.:

Condition 2: the current temperature of the FCU is detected to be greater than or equal to 5° C.: or the FCU is heated to a temperature greater than or equal to 5° C.

Through the above method, the battery can be prevented from being continuously heated in a low temperature environment, the loss of electrical energy can be reduced as much as possible, and the loss of electrical energy caused by continuous heating can be avoided.

Figure 2:
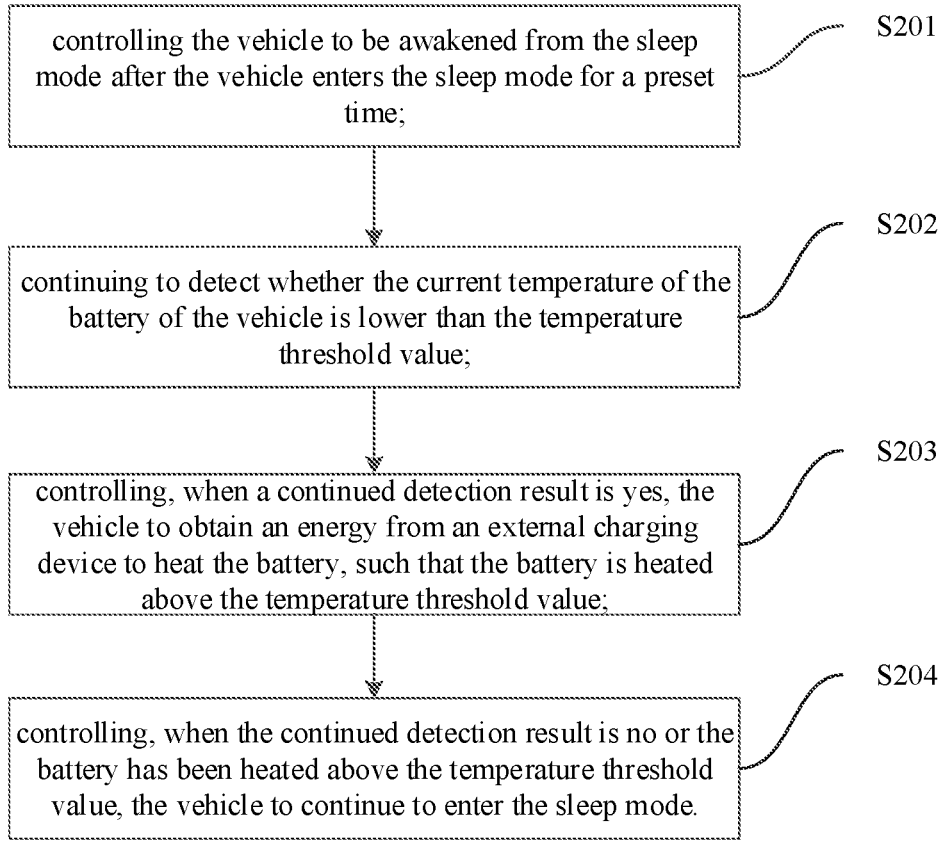
FIG. 2 is a further flowchart of a method for heat preservation of a battery of a vehicle according to an embodiment of the present application.

In an embodiment, FIG. 2 shows the steps that are continuously performed after the above-mentioned control of the vehicle to enter the sleep mode, so as to ensure that the heat preservation of the battery is realized, and the power consumption is low before the vehicle is used. As shown in FIG. 2, the method for heat preservation of a battery of a vehicle further includes:

Repeating the following steps S201-S204 until the vehicle is started:

S201: controlling the vehicle to be awakened from the sleep mode after the vehicle has entered the sleep mode for a preset time:

S202: continuing to detect whether the current temperature of the battery of the vehicle is lower than the temperature threshold value:

S203: controlling, when a continued detection result is yes, the vehicle to obtain an energy from an external charging device to heat the battery, such that the battery is heated above the temperature threshold value; and S204: controlling, when the continued detection result is no or the battery has been heated above the temperature threshold value, the vehicle to continue to enter the sleep mode.

Firstly, in step S201, taking the duration being 30 minutes as an example. Currently, the specific value can be adjusted according to actual needs, so as to ensure that the temperature of the battery can be maintained close to the temperature threshold value when the user uses the vehicle as much as possible. The vehicle is awakened from the sleep mode, so that the powered device can continue to work, and the following steps are performed.

Then, in step S202, continuing to take the BMS and the FCU as examples, and continuing to detect whether the current temperature of the BMS is lower than 20° C. and whether the current temperature of the FCU is lower than 5° C.

Then, in step S203, when the continued detection result is yes, that is, the current temperature of the BMS is less than 20° C. and/or the current temperature of the FCU is lower than 5° C., when the current temperature of the BMS is lower than 20° C., then the BMS is heated, and when the current temperature of the FCU is lower than 5° C., then the FCU is heated, so that both the BMS and the FCU are heated above the temperature threshold value.

Finally, in step S204, when the continued detection result shows that the following condition 3 or condition 4 is met, the vehicle is controlled to continue to enter the sleep mode. Condition 3, the current temperature of the BMS is greater than or equal to 20° C. and the current temperature of the FCU is greater than or equal to 5° C. Condition 4, both the BMS and the FCU are heated above the temperature threshold value.

Through the above method, the vehicle can be controlled to enter the sleep mode at a specified time, and the wake-up timing of the vehicle is calculated based on the time when the vehicle entered the sleep mode last time. For example, the time when the vehicle entered the sleep mode last time is 12:00, then the wake-up time of the vehicle should be 12:30, taking 30 minutes as an example. The vehicle must meet the conditions for entering sleep mode before entering sleep mode. In an embodiment, if the vehicle is woken up at a constant time interval, the heating time interval of the vehicle to the battery is too short when the external ambient temperature is low; and the vehicle repeatedly enters the sleep state and is woken up, and the switching process causes a waste of energy. By adopting the method of the above embodiment, the sleep mode and wake-up time interval of the vehicle can be constant, irrespective of the heating time, and the power consumption caused by the vehicle switching the sleep state in the process of heating the battery can be reduced as much as possible.

In an embodiment, the method for heat preservation of a battery further includes: controlling, in response to press operation of a user on a button for activating a function of charging and heat preservation, the vehicle to activate the function of charging and heat preservation, to perform the step of detecting whether the current temperature of the battery of the vehicle is lower than the preset temperature threshold value of the battery.

In the embodiment, when the user or driver connects the on-board charger to the power grid, the on-board host of the vehicle or the mobile phone terminal connected to the vehicle receives a button indicating whether to activate the function of charging and heat preservation. The user or driver can press the button to complete the selection operation of the function to determine whether to activate the function of charging and heat preservation; and in the case of determining activation to perform the steps in FIG. 1 and FIG. 2 above.

Through the above method, the user can manually determine whether to activate the function of charging and heat preservation, so that the requirements of the user are met to select whether to perform the charging and heat preservation of the battery of the vehicle, so as to improve the operation experience of the user.

Figure 3:
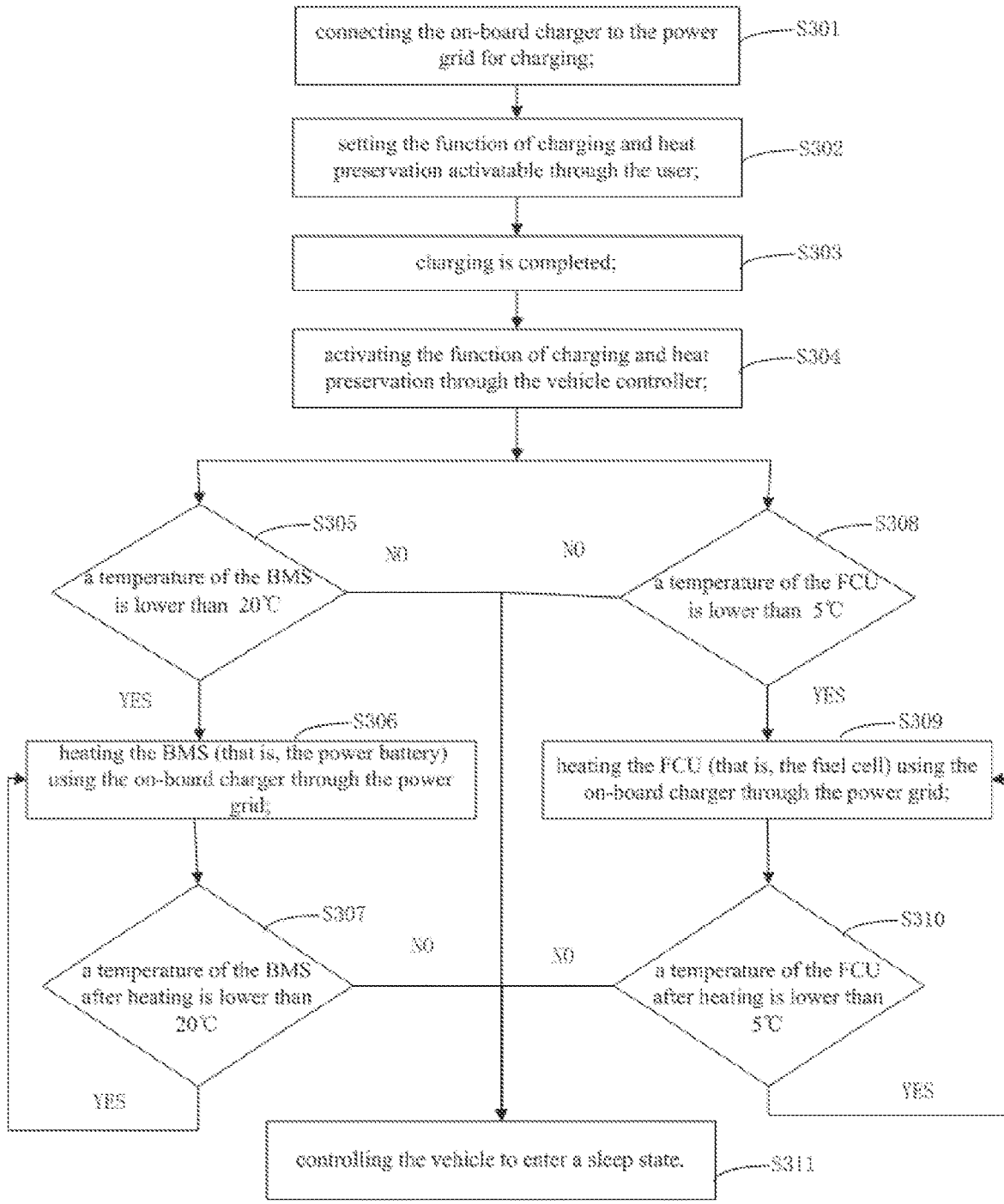
FIG. 3 is a flowchart of a method for heat preservation of a battery of a vehicle including a power battery and a fuel cell according to an embodiment of the present application.

FIG. 3 is a flowchart of a method for heat preservation of a battery of a vehicle according to the present application, which includes two types of batteries: BMS (generally referring to power battery) and FCU (generally referring to fuel cell). As shown in FIG. 3, the method for heat preservation of a battery of a vehicle includes:

Step S301: connecting the on-board charger to the power grid for charging:
Step S302: setting the function of charging and heat preservation activatable through the user:
Step S303: charging is completed:
Step S304: activating the function of charging and heat preservation through the vehicle controller:
Step S305: detecting whether the temperature of the BMS is lower than a temperature threshold value of 20° C.:
Step S306: heating, when the BMS is lower than 20° C., the BMS (that is, the power battery) using the on-board charger through the power grid:
Step S307: determining whether a temperature of the BMS after heating is lower than 20° C., and returning to step S306 when the temperature of the BMS after heating is lower than 20° C.:
Step S308: detecting whether the temperature of the FCU is lower than a temperature threshold value of 5° C.:
Step S309; heating, when the FCU is lower than 5° C., the FCU (that is, the fuel cell) using the on-board charger through the power grid:
Step S310; determining whether a temperature of the FCU after heating is lower than 5° C., and returning to step S306 when the temperature of the FCU after heating is lower than 5° C.;
Step S311: controlling, when the results of steps S308 and S310 show that the BMS and the FCU do not need to be heated, the vehicle to enter a sleep state.

In the embodiment, the method for heat preservation of a battery of a vehicle has the same advantages as the method shown in FIG. 1 and FIG. 2 compared to the conventional art, which is not repeated here.

Figure 4:
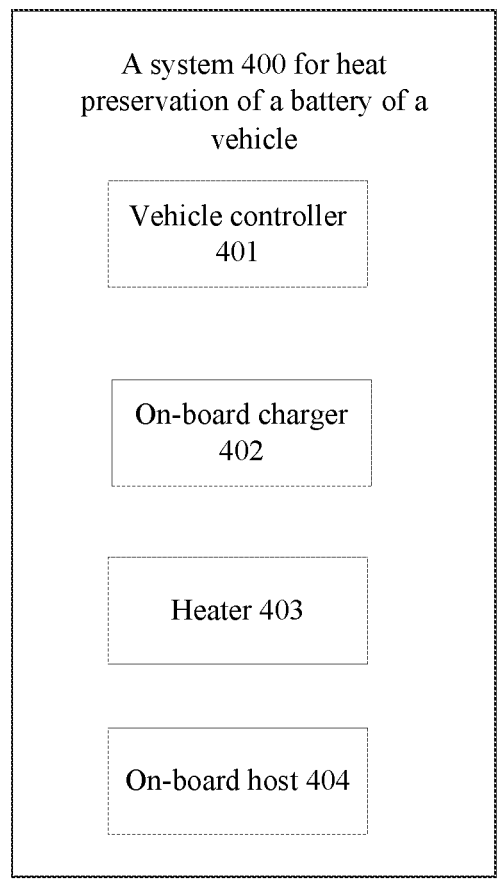
FIG. 4 is a block diagram of a system for heat preservation of a battery of a vehicle according to an embodiment of the present application.

FIG. 4 is a system 400 for heat preservation of a battery of a vehicle according to an embodiment of the present application; and the system 400 includes: a vehicle controller 401, configured for detecting, in response to completing the charging of the vehicle, whether a current temperature of the battery of the vehicle is lower than a preset temperature threshold value of the battery, wherein the temperature threshold value is configured as a lowest temperature value at which the battery is able to maintain normal performance; and an on-board charger 402, configured for controlling, when a detection result is yes, the vehicle to obtain an electrical energy from a power grid to heat the battery through a heater 403, such that the battery is heated above the temperature threshold value to complete heat preservation of the battery.

In an embodiment, the vehicle controller 401 is further configured for controlling, when the detection result is no or the battery has been heated above the temperature threshold value, the vehicle to enter a sleep mode, and the sleep mode is configured as that a powered device of the vehicle is in a power-off hibernation state.

In an embodiment, the vehicle controller 401 is further configured for repeating following steps until the vehicle is started after controlling the vehicle to enter the sleep mode: controlling the vehicle to be awakened from the sleep mode after the vehicle has entered the sleep mode for a preset time: continuing to detect whether the current temperature of the battery of the vehicle is lower than the temperature threshold value: controlling, when a continued detection result is yes, the vehicle to obtain an energy from an external charging device to heat the battery, such that the battery is heated above the temperature threshold value; and controlling, when the continued detection result is no or the battery has been heated above the temperature threshold value, the vehicle to continue to enter the sleep mode.

In an embodiment, the battery includes a fuel cell and a power battery:

the vehicle controller 401 configured for detecting whether the current temperature of the battery of the vehicle is lower than a preset temperature threshold value of the battery includes: the vehicle controller 401 being configured for detecting whether the current temperature of the fuel cell of the vehicle is lower than a preset temperature threshold value of the fuel cell, and detecting whether the current temperature of the power battery of the vehicle is lower than a preset temperature threshold value of the power battery; and the vehicle controller 401 configured for controlling, when the detection result is yes, the vehicle to obtain the electrical energy from the external charging device to heat the battery, such that the battery is heated above the temperature threshold value includes: the vehicle controller 401 being configured for controlling, when a detection result for the fuel cell is yes, the vehicle to obtain the electrical energy from the external charging device to heat the fuel cell, such that the fuel cell is heated above the temperature threshold value; and controlling, when a detection result for the power battery is yes, the vehicle to obtain the electrical energy from the external charging device to heat the power battery, such that the power battery is heated above the temperature threshold value; and the vehicle controller 401 configured for controlling, when the detection result is no or the battery has been heated above the temperature threshold value, the vehicle to enter the sleep mode includes: the vehicle controller 401 being configured for controlling the vehicle to enter the sleep mode when following conditions are met: the detection result for the fuel cell is no or the fuel cell has been heated above the temperature threshold value; and the detection result for the power battery is no or the power battery has been heated above the temperature threshold value.

The system 400 further includes: an on-board host 404, configured for controlling, in response to press operation of a user on a button for activating a function of charging and heat preservation, the vehicle to activate the function of charging and heat preservation, to perform the step of detecting whether the current temperature of the battery of the vehicle is lower than the preset temperature threshold value of the battery through the vehicle controller 401.

The advantages of the system 400 for heat preservation of a battery of a vehicle and the above-mentioned method for heat preservation of a battery of a vehicle are the same as compared to the conventional art, which is not repeated here.

In other embodiments, the system for heat preservation of a battery of a vehicle includes a processor and a memory; the execution steps of the method for heat preservation of a battery of a vehicle are stored in the memory as a program unit, and the processor executes the program unit stored in the memory to realize corresponding function.

The processor includes a kernel, and the kernel calls the corresponding program unit from the memory. The kernel can be set to one or more, by adjusting the kernel parameters to ensure the heat preservation after the battery is charged.

Memory may include non-persistent memory in computer readable media, random access memory (RAM) and/or non-volatile memory, such as read only memory (ROM) or flash memory (flash RAM), and the memory includes at least one memory chip.

An embodiment of the present application provides a machine-readable storage medium, where instructions are stored on the machine-readable storage medium, and the instructions are used to execute the above-mentioned method for heat preservation of a battery of a vehicle through a machine.

An embodiment of the present application provides a processor for running a program, and when the program is running, steps of a method for heat preservation of a battery of a vehicle are executed.

The present application further provides a computer-readable storage medium on which computer program instructions are stored, and the instructions are used to execute the above method for heat preservation of a battery of a vehicle through a machine.

As will be appreciated by those skilled in the art, the embodiments of the present application may be provided as a method, a system, or a computer program product (non-transitory computer readable storage medium having instructions, which when executed by a processor, perform actions). Accordingly, the present application can take the form of an entirely hardware embodiment, an entirely software embodiment, or an embodiment combining software and hardware aspects. Furthermore, the present application can take the form of a computer program product implemented on one or more computer-usable storage media (including, but not limited to, disk storage, CD-ROM, optical storage, etc.) having computer-usable program code implemented therein.

The present application is described with reference to flowchart illustrations and/or block diagrams of a method, an apparatus (a system), and a computer program product according to embodiments of the present application. It will be understood that each flow and/or block in the flowchart illustrations and/or block diagrams, and combinations of flows and/or blocks in the flowchart illustrations and/or block diagrams, can be implemented by computer program instructions. These computer program instructions can be provided to the processor of a general purpose computer, special purpose computer, embedded processor or other programmable data processing device to produce a machine, such that the instructions executed by the processor of the computer or other programmable data processing device to produce means for implementing the functions specified in one or more of the flowcharts and/or one or more blocks of the block diagrams These computer program instructions can also be stored in a computer-readable memory capable of directing a computer or other programmable data processing apparatus to function in a particular manner, such that the instructions stored in the computer-readable memory result in an article of manufacture including instruction means, the instruction device implements the functions specified in a flow or flows of the flowcharts and/or a block or blocks of the block diagrams.

These computer program instructions can also be loaded on a computer or other programmable data processing device, such that a series of operational steps are performed on the computer or other programmable device to produce a computer-implemented process, such that instructions executing on a computer or other programmable device thus provide steps for implementing the functions specified in one or more of the flowcharts and/or one or more blocks of the block diagrams.

In a typical configuration, a computing device includes one or more processors (CPUs), input/output interfaces, network interfaces, and memory.

Memory can include non-persistent memory in computer readable media, random access memory (RAM) and/or non-volatile memory in the form of, for example, read only memory (ROM) or flash memory (flash RAM). Memory is an example of a computer-readable medium.

Computer-readable medium includes both permanent and non-permanent, removable and non-removable media, and storage of information may be implemented by any method or technology: Information may be computer readable instructions, data structures, modules of programs, or other data. Examples of computer storage media include, but are not limited to, phase random access memory (PRAM), static random access memory (SRAM), dynamic random access memory (DRAM), other types of random access memory (RAM), read only memory (ROM), electrically erasable programmable read only memory (EEPROM), Flash Memory or other memory technology, Compact Disc Read Only Memory (CD-ROM), Digital Versatile Disc (DVD) or other optical storage, Magnetic tape cassettes, magnetic tape magnetic disk storage or other magnetic storage devices or any other non-transmission medium that can be used to store information that can be accessed by a computing device. As defined herein, computer-readable media does not include transitory computer-readable media, such as modulated data signals and carrier waves.

It should also be noted that the terms "including", "comprising" or any other variation thereof are intended to encompass a non-exclusive inclusion such that a process, method, article or device including a series of elements includes not only those elements, but also other elements not expressly listed, or which are inherent to such a process, method, article of manufacture, or apparatus are also included. Without further limitation, an element qualified by the phrase "comprising a . . . " does not preclude the presence of additional identical elements in the process, method, article of manufacture or apparatus that includes the element.

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A method for heat preservation of a battery of a vehicle, comprising:
   detecting, through a battery management system and/or a fuel cell unit, in response to completing the charging of the vehicle, whether a current temperature of the battery of the vehicle is lower than a preset temperature threshold value of the battery, wherein the temperature threshold value is configured as a lowest temperature value at which the battery is able to maintain normal performance;

controlling, through a vehicle controller, when a detection result is yes, the vehicle to obtain an electrical energy from an external charging device to heat the battery, such that the battery is heated above the temperature threshold value to complete heat preservation of the battery; and controlling, when the detection result is no or the battery has been heated above the temperature threshold value, the vehicle to enter a sleep mode, wherein the sleep mode is configured as that a powered device of the vehicle is in a power-off hibernation state;

wherein after controlling the vehicle to enter the sleep mode, further comprising:

repeating following steps until the vehicle is started:

controlling the vehicle to be awakened from the sleep mode after the vehicle has entered the sleep mode for a preset time;

continuing to detect whether the current temperature of the battery of the vehicle is lower than the temperature threshold value;

controlling, when a continued detection result is yes, the vehicle to obtain an energy from an external charging device to heat the battery, such that the battery is heated above the temperature threshold value; and controlling, when the continued detection result is no or the battery has been heated above the temperature threshold value, the vehicle to continue to enter the sleep mode.

2. The method according to claim 1, wherein the battery comprises a fuel cell and a power battery; and the step of detecting whether the current temperature of the battery of the vehicle is lower than a preset temperature threshold value of the battery comprises:

detecting whether the current temperature of the fuel cell of the vehicle is lower than a preset temperature threshold value of the fuel cell, and detecting whether the current temperature of the power battery of the vehicle is lower than a preset temperature threshold value of the power battery;

the step of controlling, when the detection result is yes, the vehicle to obtain the electrical energy from the external charging device to heat the battery, such that the battery is heated above the temperature threshold value comprises:

controlling, when a detection result for the fuel cell is yes, the vehicle to obtain the electrical energy from the external charging device to heat the fuel cell, such that the fuel cell is heated above the temperature threshold value; and controlling, when a detection result for the power battery is yes, the vehicle to obtain the electrical energy from the external charging device to heat the power battery, such that the power battery is heated above the temperature threshold value; and the step of controlling, when the detection result is no or the battery has been heated above the temperature threshold value, the vehicle to enter the sleep mode comprises:

controlling the vehicle to enter the sleep mode when following conditions are met:

the detection result for the fuel cell is no or the fuel cell has been heated above the temperature threshold value; and the detection result for the power battery is no or the power battery has been heated above the temperature threshold value.

3. The method according to claim 1, further comprising:

controlling, in response to press operation of a user on a button for activating a function of charging and heat preservation, the vehicle to activate the function of charging and heat preservation, to perform the step of detecting whether the current temperature of the battery of the vehicle is lower than the preset temperature threshold value of the battery.

4. A system for heat preservation of a battery of a vehicle, comprising:

a vehicle controller, configured for detecting, in response to completing the charging of the vehicle, whether a current temperature of the battery of the vehicle is lower than a preset temperature threshold value of the battery, wherein the temperature threshold value is configured as a lowest temperature value at which the battery is able to maintain normal performance; and an on-board charger, configured for controlling, when a detection result is yes, the vehicle to obtain an electrical energy from a power grid to heat the battery through a heater, such that the battery is heated above the temperature threshold value to complete heat preservation of the battery;

wherein the vehicle controller is further configured for controlling, when the detection result is no or the battery has been heated above the temperature threshold value, the vehicle to enter a sleep mode, wherein the sleep mode is configured as that a powered device of the vehicle is in a power-off hibernation state; and wherein the vehicle controller is further configured for repeating following steps until the vehicle is started after controlling the vehicle to enter the sleep mode:

controlling the vehicle to be awakened from the sleep mode after the vehicle has entered the sleep mode for a preset time;

continuing to detect whether the current temperature of the battery of the vehicle is lower than the temperature threshold value;

controlling, when a continued detection result is yes, the vehicle to obtain an energy from an external charging device to heat the battery, such that the battery is heated above the temperature threshold value; and controlling, when the continued detection result is no or the battery has been heated above the temperature threshold value, the vehicle to continue to enter the sleep mode.

5. The system according to claim 4, wherein the battery comprises a fuel cell and a power battery; and the vehicle controller configured for detecting whether the current temperature of the battery of the vehicle is lower than a preset temperature threshold value of the battery comprises:

the vehicle controller being configured for detecting whether the current temperature of the fuel cell of the vehicle is lower than a preset temperature threshold value of the fuel cell, and detecting whether the current temperature of the power battery of the vehicle is lower than a preset temperature threshold value of the power battery; and the vehicle controller configured for controlling, when the detection result is yes, the vehicle to obtain the electrical energy from the external charging device to heat the battery, such that the battery is heated above the temperature threshold value comprises:

the vehicle controller being configured for controlling, when a detection result for the fuel cell is yes, the vehicle to obtain the electrical energy from the external charging device to heat the fuel cell, such that the fuel cell is heated above the temperature threshold value; and controlling, when a detection result for the power battery is yes, the vehicle to obtain the electrical energy from the external charging device to heat the power battery, such that the power battery is heated above the temperature threshold value;

the vehicle controller configured for controlling, when the detection result is no or the battery has been heated above the temperature threshold value, the vehicle to enter the sleep mode comprises:

the vehicle controller being configured for controlling the vehicle to enter the sleep mode when following conditions are met: the detection result for the fuel cell is no or the fuel cell has been heated above the temperature threshold value; and the detection result for the power battery is no or the power battery has been heated above the temperature threshold value.

6. The system according to claim 4, wherein the system further comprising: an on-board host, configured for controlling, in response to press operation of a user on a button for activating a function of charging and heat preservation, the vehicle to activate the function of charging and heat preservation, to perform, through the vehicle controller, the step of detecting whether the current temperature of the battery of the vehicle is lower than the preset temperature threshold value of the battery.

7. A non-transitory computer-readable storage medium on which computer program instructions are stored, wherein the instructions are configured for executing following steps through a machine:

detecting, through a battery management system and/or a fuel cell unit, in response to completing the charging of the vehicle, whether a current temperature of the battery of the vehicle is lower than a preset temperature threshold value of the battery, wherein the temperature threshold value is configured as a lowest temperature value at which the battery is able to maintain normal performance;

controlling, through a vehicle controller, when a detection result is yes, the vehicle to obtain an electrical energy from an external charging device to heat the battery, such that the battery is heated above the temperature threshold value to complete heat preservation of the battery; and controlling, when the detection result is no or the battery has been heated above the temperature threshold value, the vehicle to enter a sleep mode, wherein the sleep mode is configured as that a powered device of the vehicle is in a power-off hibernation state;

wherein after controlling the vehicle to enter the sleep mode, further comprising:

repeating following steps until the vehicle is started:

controlling the vehicle to be awakened from the sleep mode after the vehicle has entered the sleep mode for a preset time;

continuing to detect whether the current temperature of the battery of the vehicle is lower than the temperature threshold value;

controlling, when a continued detection result is yes, the vehicle to obtain an energy from an external charging device to heat the battery, such that the battery is heated above the temperature threshold value; and controlling, when the continued detection result is no or the battery has been heated above the temperature threshold value, the vehicle to continue to enter the sleep mode.

8. The method according to claim 2, further comprising:

controlling, in response to press operation of a user on a button for activating a function of charging and heat preservation, the vehicle to activate the function of charging and heat preservation, to perform the step of detecting whether the current temperature of the battery of the vehicle is lower than the preset temperature threshold value of the battery.

9. The system according to claim 5, further comprising:

an on-board host, configured for controlling, in response to press operation of a use on a button for activating a function of charging and heat preservation, the vehicle to activate the function of charging and heat preservation, to perform, through the vehicle controller, the step of detecting whether the current temperature of the battery of the vehicle is lower than the preset temperature threshold value of the battery.

* * * * *